United States Patent [19]

St. Clair et al.

[11] Patent Number: 4,510,277

[45] Date of Patent: Apr. 9, 1985

[54] PROCESS FOR IMPROVING MOISTURE RESISTANCE OF EPOXY RESINS BY ADDITION OF CHROMIUM IONS

[75] Inventors: Anne K. St. Clair; Diane M. Stoakley; Terry L. St. Clair, all of Poquoson; Jag J. Singh, Yorktown, all of Va.

[73] Assignee: The United States of America as represented by the Administrator of the National Aeronautics and Space Administration, Washington, D.C.

[21] Appl. No.: 548,583

[22] Filed: Nov. 3, 1983

[51] Int. Cl.$^3$ .................. C08G 59/40; C08G 59/70
[52] U.S. Cl. .................................. 523/454; 523/458; 528/92; 528/106; 528/229; 528/407
[58] Field of Search ............... 528/92, 407, 106, 229; 523/454, 458

[56] References Cited

U.S. PATENT DOCUMENTS

| | | | |
|---|---|---|---|
| 3,812,214 | 5/1974 | Markovitz | 528/92 |
| 3,819,746 | 6/1974 | Katzakian et al. | 528/92 X |
| 3,956,241 | 5/1976 | Steele et al. | 528/92 |
| 4,113,791 | 9/1978 | Smith et al. | 528/92 X |
| 4,137,275 | 1/1979 | Smith et al. | 528/92 X |

Primary Examiner—Earl A. Nielsen
Attorney, Agent, or Firm—H. Osborn; J. Manning; W. Nelson

[57] ABSTRACT

A product and the process for preparing the same to improve the moisture resistance properties of epoxidized TGMDA and DGEBA resin systems by chemically incorporating chromium (III) ions therein without impairing the mechanical strength properties of the resins.

14 Claims, No Drawings

PROCESS FOR IMPROVING MOISTURE RESISTANCE OF EPOXY RESINS BY ADDITION OF CHROMIUM IONS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

A broad spectrum of thermoset epoxide resins is currently being used by the aerospace community for applications on both commercial and military aircraft primarily as composite matrices and adhesives. As a class, epoxies are extremely versatile materials offering such features as excellent mechanical properties, chemical resistance, high adhesive strength, low density, and high electrical insulation. One particular drawback associated with epoxy resins systems, however, is their tendency to absorb moisture which is dependent on both temperature and humidity conditions. It has long been documented that epoxies absorb moisture which causes a disadvantageous plasticization of the material by depressing the polymer glass transition temperature. Many research studies have been devoted to the purpose of gaining an understanding of the effect of moisture absorption on epoxy network structure and resulting property degradation.

The use of coupling agents to bond organic polymers to inorganic surfaces has been known for several decades to improve the chemical resistance to water of the interface bond. In the early 1960's, methylacrylate-chrome complexes (Volan ® by DuPont) were proven effective as coupling agents for bonding polyester and epoxy resins to glass fibers to produce composite laminates with improved moisture resistance (P. Yates and J. Trebilcock, *SPI 16th Ann. Tech. Conf. Plast.* 8-B, 1961). The mechanism of coupling to polyester resins is believed to be due to copolymerization with the methacrylic functions on the chromium (III) chloride complex, but the mechanism for coupling to epoxy resins has not been explained. Complexes of chromium (III) nitrate with certain carboxylic trans-acids have also been prepared for use as coupling agents in the preparation of glass fiber composites (U.S. Pat. No. 3,725,448).

Although the use of chromium complex coupling agents has been successful in reducing moisture absorption at the interface between resin and reinforcement, moisture absorption at the resin surface and into the bulk of the polymer remains a problem. The relatively high water uptake capacity of epoxy resins is due to the presence of —OH groups in the epoxy chains which attract polar water molecules. By the present invention a chromium ion-containing epoxy with improved resistance to moisture is produced wherein the chromium ions are believed to prevent the absorption of water molecules by themselves coordinating to the —OH groups on the epoxy chain. It is anticipated that this improved epoxy formulation will prove useful as a composite matrix resin, adhesive or casting resin for various applications including use in commercial and advanced aircraft fabrication. This improvement has been made without a sacrifice in the mechanical properties of the polymer.

It is therefore an object of the present invention to provide a process for improving the moisture resistance of epoxy resins by the addition of chromium ions.

Another object of the present invention is to provide a process for preparing a lightweight epoxy matrix resin, adhesive, or casting resin with improved moisture resistance for applications on aircraft.

A further object of the present invention is to provide an improved lightweight epoxy resin having improved moisture resistance and useful as an adhesive, matrix resin in composite fabrication or as a casting resin.

DESCRIPTION OF THE INVENTION

According to the present invention, the foregoing and additional objects are attained by providing a chromium ion-containing epoxy which has improved resistance to moisture and which exhibits little or no change in density, thermal stability or mechanical strength due to the presence of chromium ions.

The first process for producing a chromium ion-containing epoxy with improved moisture resistance according to the present invention involves the following steps: (1) addition of chromium ions to a preheated epoxide; (2) addition of a diamine curing agent; (3) thermoset of the chromium ion-containing epoxy resin by curing at 140° C.; and (4) further heating at 204° C. to postcure the polymer.

A second process for producing a chromium ion-containing epoxy with improved moisture resistance according to the present invention involves the following steps: (1) addition of chromium ions to an epoxy resin system in a solvent; (2) degassing of the chromium ion-containing resin at 120°–125° C. under vacuum; (3) cure at 150° C. to thermoset the resin; and (4) postcure of the chromium ion-containing epoxy system at 177° C.

A third process for producing a chromium ion-containing epoxy with improved moisture resistance according to the present invention involves the following steps: (1) combination of epoxide, solvent and diamine curing agent to form a premix; (2) addition of chromium ions to the premix; (3) degassing of the chromium ion-containing resin at 120°–125° C.; (4) cure at 150° C.; and (5) postcure at 177° C.

Preparation of the chromium ion-containing epoxy resin according to the first process of the present invention involves the addition of chromium ions in the form of tris(acetylacetonato)chromium (III), $Cr(acac)_3$, at a concentration of 1–13% by weight of the complex (0.1 to 1.1% metal) to an epoxide (I) based upon the diglycidyl ether of bisphenol A (DGEBA) which has been preheated at 130°–135° C. While maintaining this temperature, an aromatic diamine (4,4'-diaminodiphenylsulfone, DDS) curing agent is stirred into the epoxy mixture. A reaction scheme for the preparation of the chromium ion-containing epoxy according to the first process of the present invention is shown below.

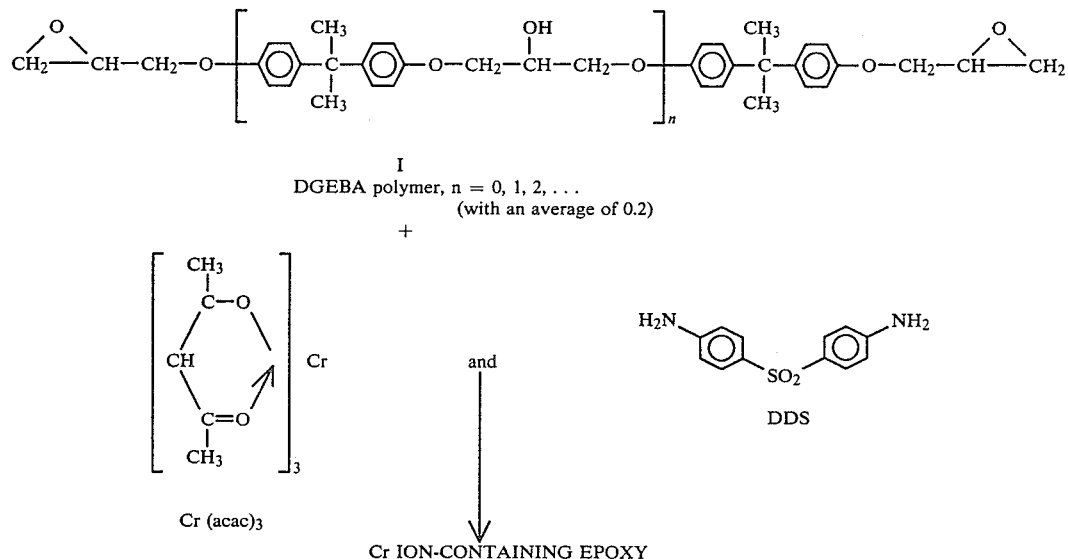

I
DGEBA polymer, n = 0, 1, 2, ...
(with an average of 0.2)

+

Cr(acac)₃ and DDS

↓

Cr ION-CONTAINING EPOXY

Preparation of the chromium ion-containing epoxy resin according to the second process of the present invention involves the addition of chromium ions in the form of Cr(acac)₃ at a concentration of 0.6–11% by weight to a commercially formulated and prepared epoxide resin system based upon bis 4-N,N-bis(2,3-epoxypropyl)phenylmethane or tetragylcidylmethylenedianiline (TGMDA) to which a low boiling solvent such as methyl ethyl ketone has been added at 35–40% by weight.

Preparation of the chromium ion-containing epoxy resin according to the third process of the present invention involves the room temperature formation of an epoxy premix resin comprised of a TGMDA epoxide (47% by weight) and an aromatic diamine curing agent such as DDS (15% by weight), and a low boiling solvent such as methyl ethyl ketone (38% by weight). Cr(acac)₃ at a concentration of 0.6–13% by weight of the metal complex is stirred into the epoxy premix prepared as stated above. The composition of the chromium ion-containing epoxy resin according to the third process of the present invention is shown below.

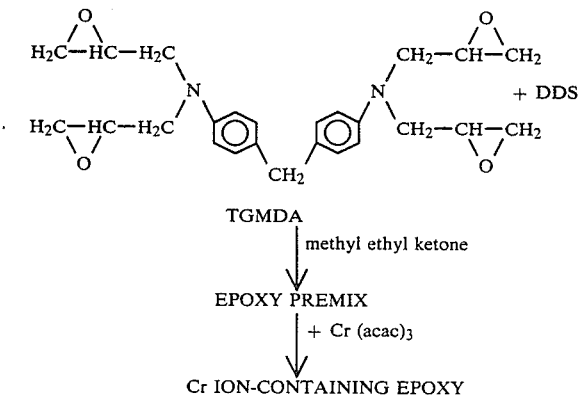

TGMDA

| methyl ethyl ketone

↓

EPOXY PREMIX

| + Cr(acac)₃

↓

Cr ION-CONTAINING EPOXY

Although the epoxy resins used in the specific examples set forth in the present invention were based upon DGEBA and TGMDA epoxides, any 1,2-epoxy resin having one or more epoxy groups per molecule may be employed. Suitable resins include any liquid or solid bisphenol A diglycidyl ether epoxy resins such as those sold under trademarks as Epon 826, 828, or 830, Epon 1001, 1002, 1004, etc. by Shell Chemical Company; any liquid or solid tetraglycidylmethylenedianiline epoxy resins such as those sold under trademarks Narmco 5208, Hercules 3502, Fiberite 934, and Hexcel 263 or other epoxy resins based on MY-720 by Ciba Geigy Corporation, e.g., ARALDITE MY-720. The epoxy resins used as specific examples of the present invention differ greatly in structure and properties ranging from a very highly crosslinked tetrafunctional epoxide TGMDA to a more linear difunctional DGEBA system. The scope of epoxy resins useful in this invention should therefore be exceedingly broad to those skilled in the art, encompassing any epoxy resin which has available during the cure stage —OH groups which are necessary for coordinating with the added chromium complex.

The ultimate success of improved moisture resistance for epoxy resins according to the present invention is dependent upon the presence of the Cr(acac)₃-tris-(acetylacetonato)chromium (III) complex. Of all the possible ligands which can coordinate to the chromium atom in a Cr (III) complex, hydroxyl is the most stable. This is believed to be the mechanism for the success of the present invention. By binding free hydroxyl groups on the epoxy, the chromium prevents water molecules from attacking the polymer. Therefore, any chromium (III)-containing salts, complexes, or organometallic complexes which have a Cr (III) atom available for hydroxyl coordination should be useful in the present invention.

Success of the present invention is also dependent upon the solubility of the chromium complex in the epoxy resin. Because of the solubility of the Cr(acac)₃ in the epoxy resins used herein, Cr (III) ions are able to chemically interact with the polymer chain rather than act as an inert filler. Although concentrations of Cr(acac)₃ range from 0.6 to 12.6% by weight in the epoxies of the specific examples used in the present invention, greater concentrations could foreseeably be used if solubility could be obtained by such mechanisms as heating, ultrasonic mixing, etc.

Although methyl ethyl ketone (MEK) was used as a solvent for some of the specific example formulations, other solvents such as acetone, toluene, xylene, methyl isobutyl ketone or any other low-boiling solvent that is miscible with the epoxide resin might be used. The quantity of solvent (approximately 40% by weight) used in preparing the Cr ion-containing epoxides herein need only be sufficient to dissolve the metal complex or allow ease in fabrication of castings by reducing the resin viscosity. However, if a solvent is used in preparing the resins of the present invention, thorough degassing in a vacuum oven is required to obtain good quality castings.

Although the diamine curing agent used in processes one and three of the present invention was DDS (4,4'-diaminodiphenylsulfone), other mono-, di- or tri-functional amine curing agents could be used by those skilled in the art such as, aniline, methylenediamine, phenylenediamine, diaminobenzophenone, diethylenetriamine, triethylenetetramine, benzyldimethylamine, 2,4,6-tri(dimethylaminoethyl)phenol, and dimethylaminomethylphenol.

Solid cast discs prepared from the Cr (III) ion-containing epoxy resins of the present invention were evaluated for moisture absorption by immersion in 120° C. water in a pressurized vessel. Results of these tests are shown in Table I. The 2¼ inch diameter, 50 mil thick epoxy discs reached saturation after approximately 200 hours. Incorporation of chromium ions into the epoxies listed in Table I reduced the moisture absorption of these resins by 17–34%.

TABLE I

| Epoxy Resin Composition | % Cr(acac)$_3$ | Mole Ratio of Cr (III) ions to Polymer Repeat Unit | Saturation Moisture Content (weight %) |
|---|---|---|---|
| NARMCO 5208 | 0 | 0 | 8.68 (±0.05) |
|  | 0.6 | 1:100 | 5.85 |
|  | 1.1 | 1:50 | 5.85 |
|  | 2.2 | 1:25 | 5.69 |
|  | 5.5 | 1:10 | 6.42 |
|  | 10.4 | 1:5 | 5.72 |
| EPON-828 with DDS curing agent | 0 | 0 | 4.01 (±0.01) |
|  | 1.3 | 1:50 | 3.88 |
|  | 2.6 | 1:25 | 3.79 |
|  | 6.3 | 1:10 | 3.74 |
|  | 12.6 | 1:5 | 3.33 |
| MY-720 with DDS curing agent | 0 | 0 | 8.92 |
|  | 0.6 | 1:100 | 6.64 |
|  | 1.3 | 1:50 | 6.25 |
|  | 2.6 | 1:25 | 6.22 |
|  | 6.3 | 1:10 | 6.36 |
|  | 12.6 | 1:5 | 6.89 |

SPECIFIC EXAMPLES

Example I

To 30.0 g EPON-828 epoxy resin which was preheated at 132° C. was added 5.24 g Cr(acac)$_3$. The mixture was stirred until all solid dissolved and while maintaining 132° C., 9.0 g DDS curing agent was added to the EPON-828/Cr(acac)$_3$ mixture and stirred until dissolved. A solid casting of the Cr ion-containing epoxy was prepared by pouring the resin into an aluminum pan, curing in an oven for two hours at 140° C. to thermoset, and postcuring at 204° C. for four hours. The resulting disc containing a 1:5 mole ratio of chromium (III) to epoxy repeat unit (1.10% Cr) was a dark blue-green color and transparent. The Cr ion-containing epoxy had a density of 1.240 g/cc and a glass transition temperature of 169° C. The Cr ion-containing disc absorbed 17% less moisture than the control epoxy.

Example II

The process of Example I was repeated using 7.2 g EPON-828, 0.63 g Cr(acac)$_3$, and 2.16 g DDS to produce a Cr ion-containing resin with a 1:10 mole ratio of Cr (III) to polymer repeat units and improved resistance to moisture.

Example III

The process of Example I was repeated using 7.2 g EPON-828, 0.25 g Cr(acac)$_3$, and 2.16 g DDS to produce a Cr ion-containing resin with a 1:25 mole ratio of Cr (III) to polymer repeat units and improved moisture resistance.

Example IV

The process of Example I was repeated using 7.2 g EPON-828, 0.13 g Cr(acac)$_3$, and 2.16 g DDS to produce a Cr ion-containing epoxy with improved moisture resistance having a mole ratio of 1:50 Cr (III) to polymer repeat units.

Example V

To a solution of 5 g Narmco 5208 epoxy resin and 3 g of methyl ethyl ketone (MEK), 0.290 g Cr(acac)$_3$ was added. The resulting red-purple solution was allowed to stir at room temperature for two hours. The resin was poured into a 2¼ inch diameter aluminum pan and degassed in a vacuum oven at 125° C. for approximately 30 minutes. The degassed epoxy was then cured one hour at 150° C. The transparent reddish brown epoxy was then postcured for two hours at 175° C.–177° C. The resulting Cr (III) ion-containing epoxy disc had a concentration of 5.5% Cr(acac)$_3$ (a mole ratio of one Cr (III) ion to every ten polymer repeat units). This Cr (III)/epoxy showed a 26% improvement in moisture resistance over the 5208 control epoxy. Improved moisture resistance was obtained at no sacrifice in mechanical strength.

Example VI

The process of Example V was repeated using 5 g Narmco 5208, 3 g MEK, and 0.58 g Cr(acac)$_3$ to produce a Cr ion-containing epoxy with a mole ratio of 1:5 Cr (III) to polymer repeat units and improved moisture resistance.

Example VII

The process of Example V using 5 g Narmco 5208, 3 g MEK, and 0.116 g Cr(acac)$_3$ to produce a Cr ion-containing epoxy with a mole ratio of 1:25 Cr (III) to polymer repeat units and improved moisture resistance.

Example VIII

The process of Example V using 5 g Narmco 5208, 3 g MEK, and 0.058 g Cr(acac)$_3$ to produce an epoxy resin with a 1:50 mole ratio Cr (III) to epoxy repeat units and improved resistance to moisture.

Example IX

The process of Example V using 5 g Narmco 5208, 3 g MEK, and 0.029 g Cr(acac)$_3$ to produce an epoxy resin with improved moisture resistance having a mole ratio of 1:100 Cr (III) to polymer repeat units.

Example X

A mixture comprising 3.79 g MY-720 epoxy, 1.21 g DDS, and 3.00 g MEK was stirred for two hours at room temperature to form an epoxy premix. To this premix was added 0.33 g Cr(acac)$_3$ and the resin stirred several hours. A solid disc casting of the resin was prepared by pouring the Cr ion-containing epoxy into an aluminum pan and degassing in a vacuum oven at 120° C.–125° C. for approximately 30 minutes followed by one hour cure at 150° C. and a two hour post cure at 177° C. The resulting disc was a dark red-brown color, transparent and contained a 1:10 mole ratio of Cr (III) ions to polymer repeat units. This Cr ion-containing epoxy absorbed approximately 30% less moisture than the control epoxy.

Example XI

The process of Example X using 3.79 g MY-720, 1.21 g DDS, 3.00 g MEK and 0.668 g Cr(acac)$_3$.

Example XII

The process of Example X using 3.79 g MY-720, 1.21 g DDS, 3.00 g MEK and 0.134 g Cr(acac)$_3$.

Example XIII

The process of Example X using 3.79 g MY-720, 1.21 g DDS, 3.00 g MEK and 0.067 g Cr(acac)$_3$.

Example XIV

The process of Example X using 3.79 g MY-720, 1.21 g DDS, 3.00 g MEK and 0.033 g Cr(acac)$_3$.

SUMMARY

The foregoing specific examples are merely to illustrate the present invention in exemplary fashion and are not intended, or to be interpreted, as exhaustive.

The specific resins, solvents, curing agents and chromium salts shown in the schematic reactions and described in the specific examples herein are also exemplary only and are intended merely to illustrate the reaction. It is to be understood that any epoxidized TGMDA and DGEBA resin, having chromium (III) ions chemically incorporated therein and exhibiting improved moisture resistance properties, is considered within the scope of the present invention.

Thus, various modifications and variations of the present invention will be apparent to those skilled in the art in the light of the above teachings. It is therefore to be understood that, within the scope of the appended claims, the invention may be practiced otherwise than as specifically described.

What is claimed as new and desired to be secured by Letters Patent of the United States is:

1. A method for preparing a chromium ion-containing epoxy resin comprising:
   adding a quantity of chromium ions to an epoxide based upon the diglycidyl ether of bisphenol A (DGEBA) that has been previously preheated to the temperature of 130°–135° C.; and,
   while maintaining this temperature range, adding an amine curing agent to the epoxide-chromium mixture and further heating to cure the mixture to obtain a chromium ion-containing epoxy useful as an adhesive, composite matrix or as a casting and that has improved moisture resistance over epoxies having no chromium ions therein.

2. The method of claim 1 wherein the chromium ions added to the epoxide is in the form of a chromium ion-containing metal complex and constitutes 1–13% by weight of the epoxide-diamine-chromium epoxy resin formulation.

3. The method of claim 1 wherein the chromium ions added to the epoxide is in the form of tris-(acetylacetonato)chromium (III) or Cr(acac)$_3$.

4. The method of claim 1 wherein the amine curing agent is selected from the group consisting of:
   4,4'-diaminodiphenylsulfone, aniline, methylenediamine, phenylenediamine, diaminobenzophenone, diethylenetriamine, triethylenetetramine, benzyldimethylamine, 2,4,6-tri(dimethylaminoethyl)phenol, and dimethylaminomethylphenol.

5. The method of claim 1 wherein the amine curing agent is the aromatic diamine 4,4'-diaminodiphenylsulfone.

6. A method of preparing a chromium ion-containing epoxy resin comprising:
   (1) mixing at room temperature
   a. a TGMDA (tetraglycidylmethylenedianiline)epoxide
   b. an amine curing agent for the epoxide, and
   c. a low boiling point solvent; and
   (2) adding 0.6–13% by weight of tris-(acetylacetonato)chromium (III) to the mixture of step (1) to recover a chromium ion-containing epoxy resin that is useful as a composite matrix, adhesive or casting resin and exhibits improved moisture resistance property characteristics when cured.

7. The method of claim 6 wherein the amine curing agent is selected from the group consisting of:
   aniline, 4,4'-diaminodiphenylsulfone, methylenediamine, phenylenediamine, diaminobenzophenone, diethylenetriamine, triethylenetetramine, benzyldimethylamine, 2,4,6-tri(dimethylaminoethyl)phenol, and dimethylaminomethylphenol.

8. The method of claim 6 wherein the amine curing agent is the aromatic diamine 4,4'-diaminodiphenylsulfone.

9. The method of claim 6 wherein the concentration of the mixture of epoxide-diamine-solvent comprises 47% by weight epoxide, 15% by weight diamine and 38% by weight solvent.

10. The method of claim 9 wherein the solvent is methyl ethyl ketone.

11. A method for preparing a chromium (III) ion-containing epoxy product having improved moisture resistance properties comprising:
   admixing a chromium (III) ion-containing complex in a low boiling solvent to an epoxy resin formulation having one or more 1,2-epoxy group per molecule;
   degassing the chromium ion-containing resin under vacuum and elevated temperature conditions and, further increasing the temperature to cure the degassed mixture and recover a chromium (III) ion-containing epoxy product;
   wherein the epoxy resin is based upon the following epoxy polymer structure;

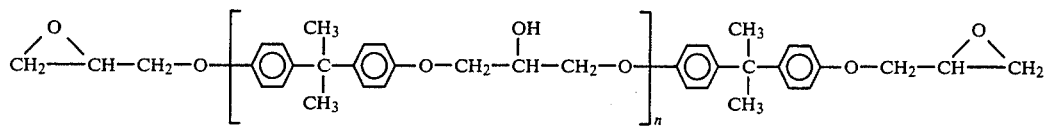

where n=0, 1, 2 . . . and averages approximately 0.2; and has present the aromatic diamine curing agent 4,4'-diaminodiphenylsulfone and a solvent or mixture of solvents at least one of which is selected from the group consisting of: methyl ethyl ketone, acetone, toluene, xylene, and methyl isobutyl ketone.

12. A method for preparing a chromium (III) ion-containing epoxy product having improved moisture resistance properties comprising:

admixing a chromium (III) ion-containing complex in a low boiling solvent to an epoxy resin formulation having one or more 1,2-epoxy group per molecule;

degassing the chromium ion-containing resin under vacuum and elevated temperature conditions and, further increasing the temperature to cure the degassed mixture and recover a chromium (III) ion-containing epoxy product;

wherein the epoxy resin is based upon the following epoxy polymer structure;

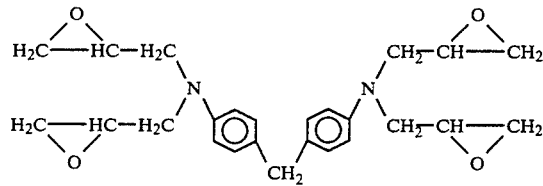

and has present an aromatic diamine curing agent 4,4'-diaminodiphenylsulfone and a solvent or mixture of solvents at least one of which is selected from the group consisting of: methyl ethyl ketone, acetone, toluene, xylene, and methyl isobutyl ketone.

13. A moisture resistant chromium ion-containing epoxy resin prepared according to the process of claim 11.

14. A moisture resistant chromium ion-containing epoxy resin prepared according to the process of claim 12.

* * * * *